June 4, 1940.                S. A. CARTER                2,202,832
                            PRODUCE BASKET
                         Filed Feb. 1, 1938          2 Sheets-Sheet 1

Inventor
S. A. Carter

By Clarence A. O'Brien
   Hyman Berman
                Attorneys

June 4, 1940.　　　S. A. CARTER　　　2,202,832
PRODUCE BASKET
Filed Feb. 1, 1938　　　2 Sheets-Sheet 2

Inventor
S. A. Carter
By Clarence A. O'Brien
Hyman Berman
Attorneys

Patented June 4, 1940

2,202,832

UNITED STATES PATENT OFFICE 2,202,832

PRODUCE BASKET

Sylvester A. Carter, Roanoke, Va., assignor of twenty per cent to Robert C. Nelms, one-tenth to Roland Turner, and fifty per cent to Mary E. Carter, all of Roanoke, Va.

Application February 1, 1938, Serial No. 188,158

3 Claims. (Cl. 217—123)

This invention relates to a produce basket, such as that used for apples and the like, the general object of the invention being to provide a bottom member for the basket, which is provided with an opening, closed by a removable door, whereby the basket can be packed in the usual manner and the top put in place and then when it is desired to inspect the contents of the basket or to recondition the pack, such as by adding more articles to the pack to compensate for shrinkage or the like, the basket can be turned upside down, the door removed, and then the contents can be inspected or reconditioned, after which the door is replaced. Thus with this invention, access can be had to the interior of the basket without necessitating repacking of the contents after the same has been inspected or reconditioned and without disturbing the top of the basket.

This application is a continuation in part of an application filed by me on September 4, 1937, Serial No. 162,480.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which.

Figure 1:
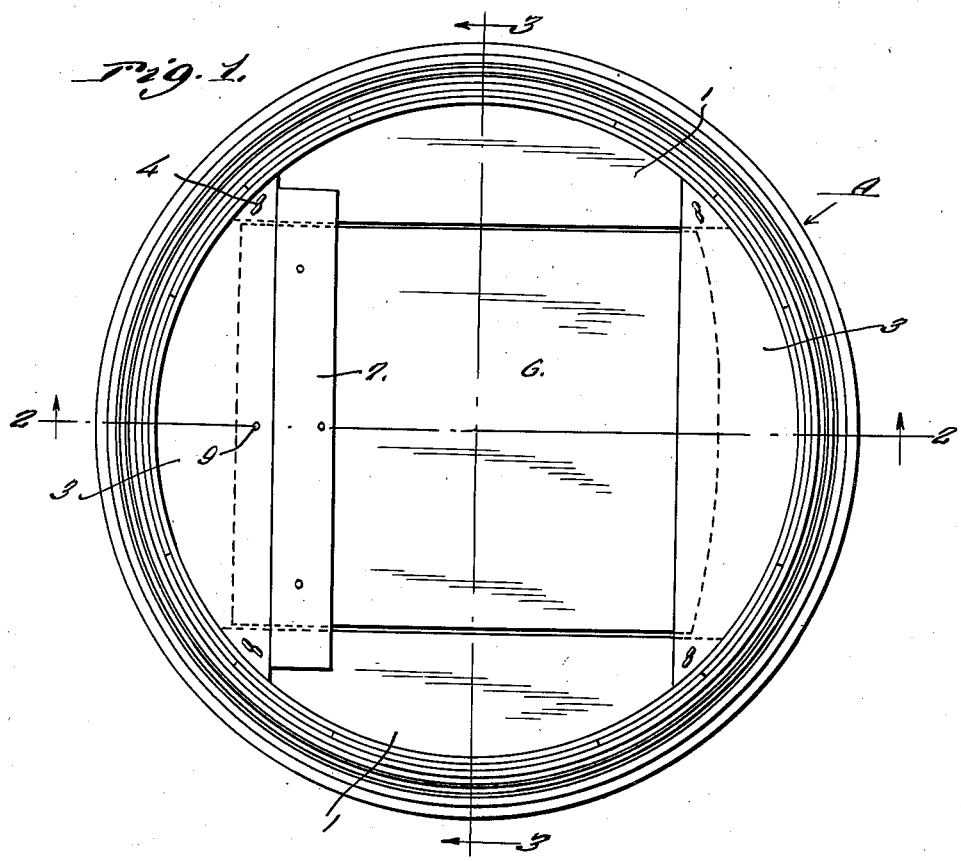
Figure 1 is a view of the basket turned upside down and showing the construction of the bottom member thereof.
Figure 5:
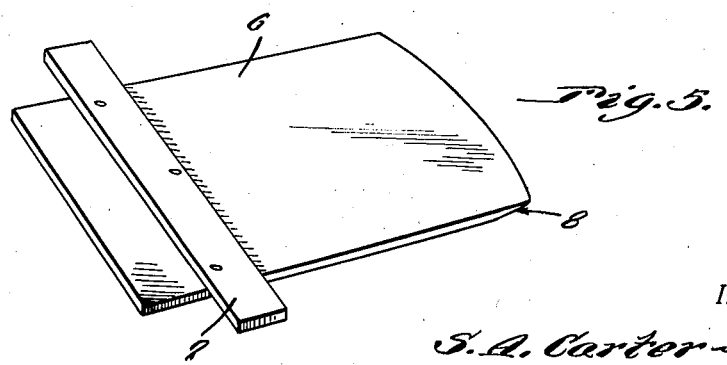
Figure 5 is a view of the door or closure member for the bottom member.

In these drawings, the basket is shown at A and is of the usual or any desired construction, and the letter B indicates my improved bottom member which is shown in the drawings as resting upon an inner hoop a at the bottom of the basket.

The bottom member includes a pair of segmental members 1 which are oppositely arranged and spaced apart and the two pairs of segmental members 2 and 3, the member 2 of each pair being located below and spaced from the member 3 of said pair. These members 2 and 3 are arranged at right angles to the members 1 and have their ends overlapping the ends of the members 1, with the ends of said members 1 fitting in the spaces between the members 2 and 3, and the ends of each pair of members 2 and 3 are connected with the ends of the members 1 by suitable fastening means shown at 4 in Figure 1. Thus these members 1, 2 and 3 form a rectangular opening in the bottom member B, which is of considerable area, so that ready access to the interior of the basket is had through said opening when the same is uncovered. The bottom member is fastened in position in the bottom of the basket by any suitable means, such as the nails or staples 5, which pass through the sides of the basket into portions of the bottom member.

Figure 2:
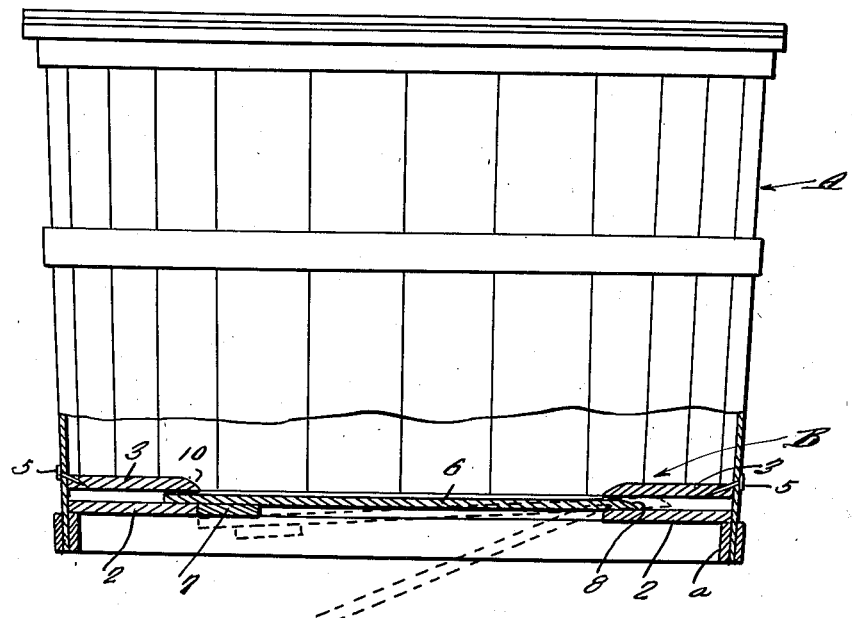
Figure 2 is a section on line 2—2 of Figure 1, but with the basket in upright position.

The door or closure member is shown at 6, and while it is shown as formed of one piece of material, it will, of course, be understood that it can be formed of several pieces suitably connected together. A cross piece 7 is connected to the under face of the door and extends transversely with its ends projecting from the side edges of the door, and said cross piece is spaced an appreciable distance from one end of the door. The opposite end of the door or closure member is beveled on its top face, as shown at 8, to facilitate this end of the door being passed between one pair of the members 2 and 3, and as will be seen from Figure 2, when the door is to be put in place, it is placed in an inclined position and the beveled end passed into the space between a pair of the members 2 and 3, and then the door is swung upwardly and to the right in Figure 2 a sufficient distance to enable the opposite end to clear the opposite lower member 2. Then the door is moved to the left to place said opposite end between the opposite pair of members 2 and 3, with the cross piece 7 abutting the inner edge of the lower member 2 of said opposite pair. Then a tack or nail 9 may be driven through said member 2 into the end of the door to hold the door in closed position, as shown in Figure 1.

As will be seen, when the door is in position it will lie in the same horizontal plane as the members 1, with the members 2 and 3 above and below the ends of the door and in order to prevent the inner edges of the members 3 from injuring the contents of the basket, said end edges are beveled, as shown at 10.

Figure 3:
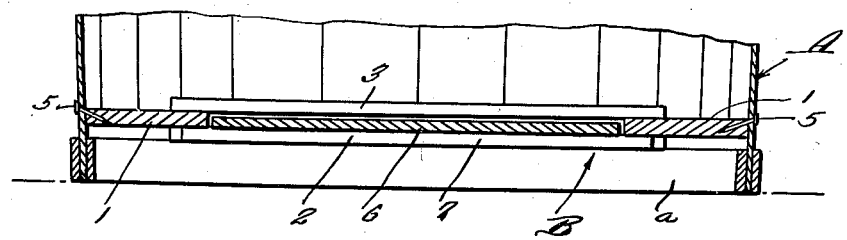
Figure 3 is a section on line 3—3 of Figure 1, with the basket in upright position.
Figure 4:
Figure 4 is a view of one of the segmental members.

It will be understood that the bottom member is put in place with the door closed and held in closed position by the fastener 9 and the basket is packed in the usual manner. Then if it is desired to inspect the fruit or other contents of the basket to recondition the same or to add to the pack in order to compensate for shrinkage, or for any other reason, the basket is inverted to place the bottom uppermost, and then the fastener 9 is removed and the door or closure member slid to the right in Figures 1, 2 and 3, so that the end adjacent the cross piece 7 will clear the left member 2. Then the door is raised and moved to the left, which will release the door from the bottom member and, of course, uncover the opening in the bottom member so that access can be had to the interior of the basket. After the contents have been inspected, reconditioned or otherwise treated, the door is replaced and fastened in position. As will be seen, all this can be done without disturbing the face of the pack or removing the top. Thus this invention permits the best and most economical mode of packing, combined with the best and most economical way of inspecting, tightening and reconditioning the pack. It will, of course, be understood that if desired the packing can be done from the bottom by inverting the basket and removing the door.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A basket bottom comprising a pair of segmental members spaced apart and having flat inner edges, a second pair of segmental members extending at right angles to the first pair and having their ends overlapping the ends of the first pair, means for securing the ends of each segmental member of the second pair to the ends of the first-mentioned segmental members, the four segmental members forming a rectangular opening, a third pair of segmental members paralleling the second pair and engaging the opposite faces of the first pair and a closure member for closing the rectangular opening, said closure member having flat side edges paralleling the straight inner edges of the first pair of segmental members, with the ends of the closure member fitting between the segmental members of the second and third pairs, a cross piece connected to the outer face of the closure member and having its ends projecting from the side edges thereof and engaging the outer faces of the first pair of segmental members, said cross piece being spaced a slight distance from one end of the closure member, the other end of the closure member being spaced a sufficient distance from the curved edges of the adjacent segmental members of the second and third pairs to permit the closure member to be moved a sufficient distance to permit the opposite end of the closure member to be moved beyond the inner edge of the adjacent segmental member of the second pair to permit the closure member to be swung outwardly and removed from the bottom.

2. A bottom for a basket comprising pairs of opposed bottom sections extending inwardly of the basket and forming therebetween a rectangular opening, the sections of one pair lying below the sections of the other pair and having the ends thereof connected to the sections of said other pair, and a substantially rigid closure panel for said opening fitting between the sections of said other pair and having its opposite edges overlying the sections of said one pair, said panel being slidable on the sections of said one pair within the confines of the basket, to free one edge thereof and swingably downwardly on its opposite edge to tilt the same downwardly out of said opening for removal therethrough, and means located above the planes of the sections and spaced from the sections of said one pair and forming with said one pair slots for receiving the ends of the closure panel.

3. A bottom for a basket comprising pairs of opposed bottom sections extending inwardly of the basket and forming therebetween a rectangular opening, the sections of one pair lying below the sections of the other pair and having the ends thereof connected to the sections of said other pair, and a substantially rigid closure panel for said opening fitting between the sections of said other pair and having its opposite edges overlying the sections of said one pair, said panel being slidable on the sections of said one pair within the confines of the basket, to free one edge thereof and swingably downwardly on its opposite edge to tilt the same downwardly out of said opening for removal therethrough, and a second pair of sections overlying and spaced from the sections of said one pair and having their ends overlapping the ends of the sections of said other pair.

SYLVESTER A. CARTER.